United States Patent [19]

Wada et al.

[11] Patent Number: 5,625,852
[45] Date of Patent: Apr. 29, 1997

[54] CAMERA PROVIDED WITH A BARRIER

[75] Inventors: Shigeru Wada, Kishiwada; Ikushi Nakamura, Sakai, both of Japan

[73] Assignee: Minolta Co., Ltd., Osaka, Japan

[21] Appl. No.: 590,112

[22] Filed: Jan. 23, 1996

[30] Foreign Application Priority Data

Jan. 27, 1995 [JP] Japan .................... 7-011879

[51] Int. Cl.$^6$ .................................................. G03B 17/04
[52] U.S. Cl. ................................................ 396/349; 396/448
[58] Field of Search ............................ 354/149.1, 149.11, 354/187, 195.1, 202, 253; 396/349, 448

[56] References Cited

U.S. PATENT DOCUMENTS

| | | | |
|---|---|---|---|
| 4,350,423 | 9/1982 | Engelsmann et al. | 354/173 |
| 4,728,977 | 3/1988 | Yomogizawa et al. | 354/187 |
| 4,752,796 | 6/1988 | Tsukahara et al. | 354/187 |
| 4,958,177 | 9/1990 | Akitake | 354/195.1 |
| 5,168,295 | 12/1992 | Yoshihara et al. | 354/173.1 |
| 5,461,441 | 10/1995 | Kotani | 354/187 |
| 5,489,958 | 2/1996 | Katagiri et al. | 354/195.12 |

FOREIGN PATENT DOCUMENTS 06130477A 5/1994 Japan.

*Primary Examiner*—Safet Metjahic
*Assistant Examiner*—Eddie C. Lee
*Attorney, Agent, or Firm*—Burns, Doane, Swecker & Mathis, LLP

[57] ABSTRACT

A camera includes: a driving source which generates a driving force; a film driving mechanism which uses the driving force to drive a loaded film; a barrier which is movable between a close position of covering a lens and an open position of exposing the lens; a barrier driving mechanism which uses the driving force to move the barrier between the close position and the open position; and a path changeable transmission device which changeably transmits the driving force from the driving source to the film driving mechanism and to the barrier driving mechanism, the path changeable transmission device having a first state of transmitting the driving force to the film driving mechanism and a second state of transmitting the driving force to the barrier driving mechanism.

10 Claims, 16 Drawing Sheets

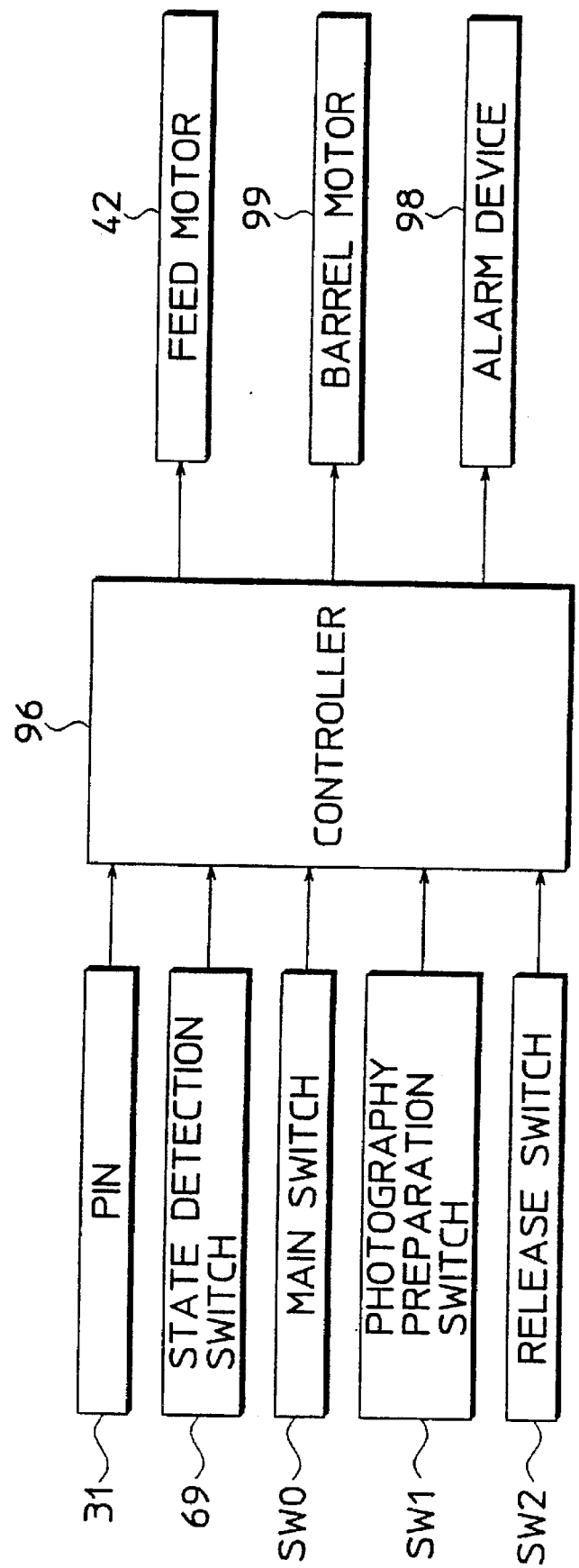

PRIOR ART

CAMERA PROVIDED WITH A BARRIER

BACKGROUND OF THE INVENTION

This invention relates to a camera provided with a barrier for protecting a barrel in its retraction position.

In general, a camera provided with a barrier needs to have a means for opening and closing the barrier. This makes the size of the entire camera larger. Particularly, in the case of use of a barrier for covering the entire barrel which houses the lens, not a lens barrier for covering a lens, the barrier itself is large and a device for driving the barrier tends to be large. Thus, how the size of the entire camera can be made smaller is an important object to attain.

FIG. 16 shows an exemplary barrier driving mechanism of prior art. A gear 201 is mounted at the rear end of an illustrated barrel 200, and a motor 202 for driving the barrel 200 is provided near the barrel 200. A gear 203 is secured on an output shaft of the motor 202, and is in mesh with the gear 201. A cam groove 204 is formed in the side wall of the barrel 200. An unillustrated pin is fitted into the cam groove 204 sideways. As the barrel 200 is drivingly rotated by the motor 202, it moves between an unillustrated retracted position and a projection position located more forward than the retraction position.

A barrier 205 is provided before the barrel 200 in its retraction position. The barrier 205 is rotatable about a rotatable shaft 206 extending in the forward/backward direction. The barrier 205 rotates between a closure position (shown) where it covers the front end of the barrel 200 and an open position away from the closure position. A claw member 208 is mounted at the rear end of the rotatable shaft 206, and a coil spring 207 is mounted over the rotatable shaft 206 and the claw member 208. The barrier 205 is held in its closure position by an elastic force of the coil spring 207.

A rotatable member 209 is provided between the barrier 205 and the barrel 200, rotatably about a rotatable shaft 210 extending in the vertical direction. A pin 209a which comes into contact with the front end of the barrel 200 projects at the rear end of the rotatable member 209. The rotatable member 209 is biased by a spring 211 in such a direction as to hold a front end 209b of the rotatable member 209 in contact with the claw member 208.

In this construction, when the barrel 200 in its retraction position is rotated by operating the motor 202, the barrel 200 moves forward (indicated by the arrow A) by interaction of the cam groove 204 and the unillustrated pin, and a front end surface 200a of the barrel 200 presses the pin 209a forward. Thereby, the rotatable member 209 rotates in a direction indicated by the arrow B, and its front end 209b rotates the claw member 208 and the barrier 205 against the elastic force of the coil spring 207 in a direction indicated by the arrow C from the closure position.

In this construction, the motor 202 is used also as a driving source of the barrier 205 so as to make the construction smaller.

In the above construction, when the barrel 200 is moved forward, it has to press the pin 209b forward against the elastic force of the coil spring 207. In other words, the driving force of the motor 202 needs to be sufficient to move the barrel 200 forward and to rotate the claw member 208 and the barrier 205 against the elastic force of the coil spring 207. This requires the motor 202 to have a large capacity, thereby standing as a hindrance to making the size of the entire construction smaller and fabricating it at a reduced cost.

SUMMARY OF THE INVENTION

It is an object of the present invention to provide a camera provided with a barrier which has overcome the problems residing in the prior art.

It is another object of the present invention to provide a camera provided with a barrier which has a smaller driving construction for closing and opening the barrier.

The present invention is directed to a camera comprising: a driving source which generates a driving force; a film driving mechanism which uses the driving force to drive a loaded film; a barrier which is movable between a closed position of covering a lens and an open position of exposing the lens; a barrier driving mechanism which uses the driving force to move the barrier between the closed position and the open position; and a path changeable transmission device which changeably transmits the driving force from the driving source to the film driving mechanism and to the barrier driving mechanism, the path changeable transmission device having a first state of transmitting the driving force to the film driving mechanism and a second state of transmitting the driving force to the barrier driving mechanism.

The camera may be further provided with a lens barrel movable between a projection position of projecting from a main body of the camera and a retraction position of retracting in the camera main body. The path changeable transmission device may be provided with a changing member operatively connected with the barrel, the changing member being moved to a first position when the barrel is moved to the projection position of the barrel and to a second position when the barrel is moved to the retraction position of the barrel.

The path changeable transmission device may be preferably placed in the first state when the changing member is in the first position and in the second state when the changing member is in the second position.

The barrier driving mechanism may be preferably transmitted with the driving force that is usable for the film driving mechanism to rewind the film.

The camera may be further provided with a flash which generates flash light and is movable between two specified positions; and a mechanism which operatively connects the movement of the barrier with the movement of the flash.

The barrier driving mechanism may be preferably placed in operation when the lens barrel is in the retraction position.

Also, the present invention is directed to a camera comprising: a lens barrel which is movable between a projection position of projecting from a main body of the camera and a retraction position of retracting in the camera main body; a film driving mechanism which drives a loaded film; a barrier which is movable between a closed position of covering the lens barrel in the retraction position and an open position of allowing the lens barrel to project from the main body: a barrier driving mechanism which moves the barrier between the closed position and the open position; a first driving source which is adapted for driving the lens barrel; a second driving source which is adapted for driving the film driving mechanism and the barrier driving mechanism; and a path changeable transmission device which changeably transmits a driving force of the second driving source to the film driving mechanism and the barrier driving mechanism.

The path changeable transmission device may be operatively connected with the movement of the barrel to transmit the driving force of the second driving source to the barrier driving mechanism when the lens barrel is in the retraction position and to transmit the driving force of the second driving source to the film driving mechanism when the lens barrel is in the projection position.

Further, the present invention is directed to a camera comprising: a lens barrel which is movable between a projection position of projecting from a main body of the camera and a retraction position of retracting in the camera main body; a first driving motor which generates a driving force for the movement of the lens barrel; a film driving mechanism which drives winding and rewinding of a loaded film; a barrier which is movable between a closed position of covering the lens barrel in the retraction position and an open position of allowing the lens barrel to project from the main body; a second driving motor which generates a driving force for the film driving mechanism and the barrier driving mechanism; and a path changeable transmission device which changeably transmits the driving force of the second driving motor to the film driving mechanism and the barrier driving mechanism.

With the camera, there is provided the path changeable transmission device which changeably transmits the driving force to the film driving mechanism and to the barrier driving mechanism. This will make it possible to produce a camera which is considerably smaller.

Also, the driving force is not used at the same time for the film driving and the barrier driving. Accordingly, the driving source can have a smaller capacity. This is advantageous in reducing the production costs as well as the camera size.

In the camera provided with the lens barrel, further, the path changeable transmission device is operatively connected with the barrel to transmit the driving force to the barrier driving mechanism when the lens barrel is in its retraction position and to transmit the driving force to the film driving mechanism when the lens barrel is in its projection position. This will make it possible to automatically change the drive transmission path at suitable timings without any controlling operation. Also, this will reliably prevent the barrier from being driven when the lens barrel is in the projection position.

Further, the driving force in the film rewinding direction is transmitted to the barrier driving mechanism. This will simplify the construction of the film and barrier driving mechanisms, thereby reducing the size of camera.

Moreover, the movement of the barrier is operatively connected with the movement of the flash. This will make easier the operation of flash and simplify the flash movement.

These and other objects, features and advantages of the present invention will become more apparent upon a reading of the following detailed description and accompanying drawings.

BRIEF DESCRIPTION OF THE DRAWINGS

FIG. 12 is a block diagram showing a construction of a control system of the camera;

DETAILED DESCRIPTION OF THE PREFERRED EMBODIMENTS OF THE INVENTION

One embodiment of the present invention will be described with reference to the accompanying drawings.

Figure 1:
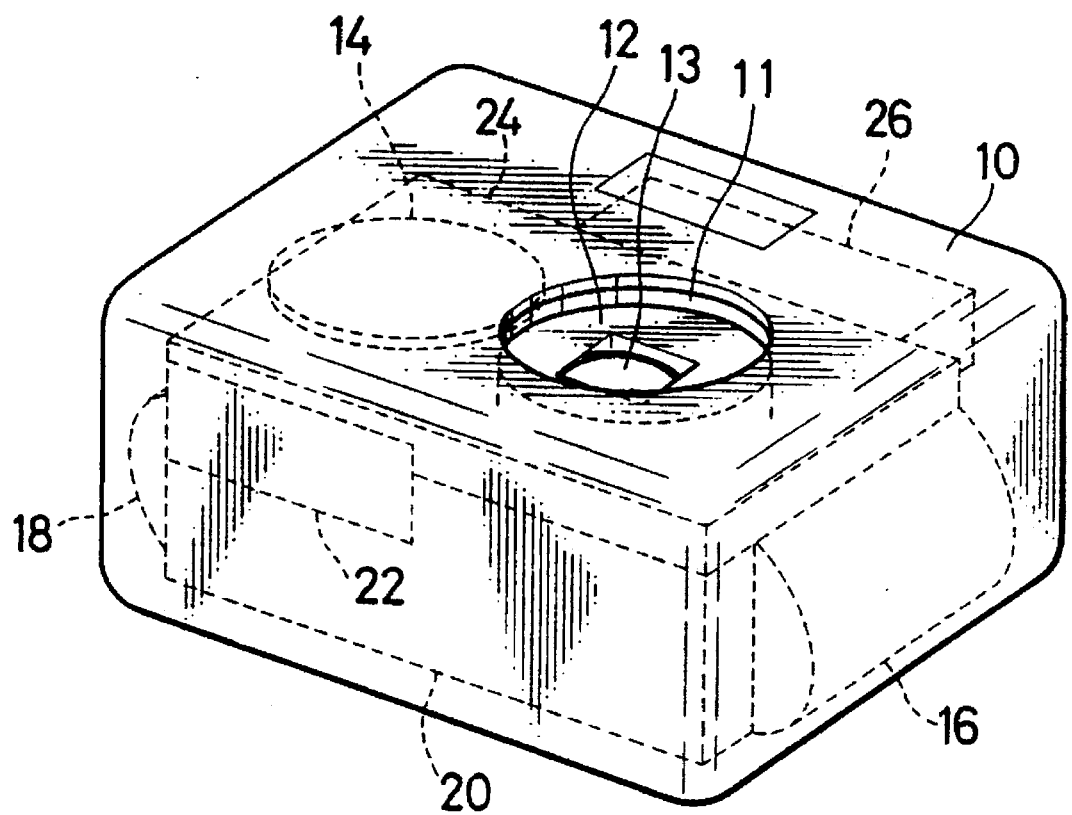
FIG. 1 is a perspective view of an entire camera as one embodiment of the invention, a front portion of the camera facing upward.
Figure 16:
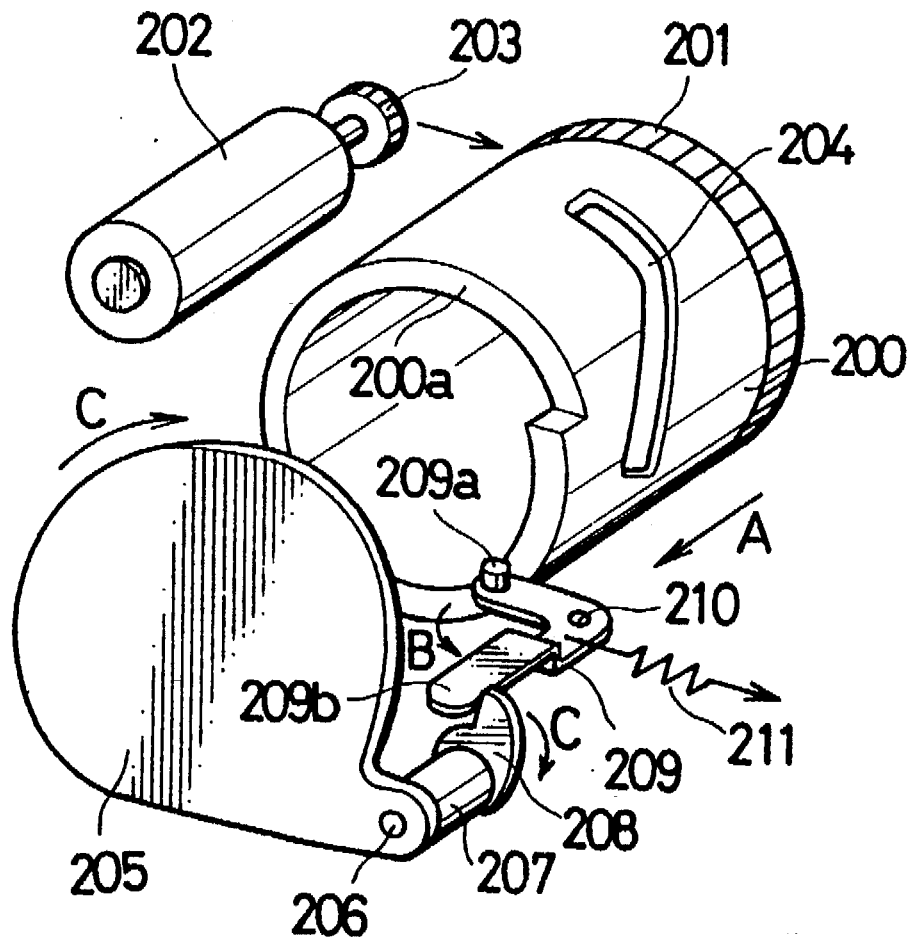
FIG. 16 is a perspective view showing an exemplary barrel and barrier driving mechanism of a prior art camera.

FIG. 1 is a perspective view showing a camera embodying the invention when the camera is placed in such a posture that its front portion faces upward. The camera is provided with a cover 10. An opening 11 is formed in a front wall of the cover 10. A barrel 12 is located in a position corresponding to the opening 11. The barrel 12 holds a lens 13 in its center portion, and is driven by an unillustrated driving mechanism (e.g. the driving mechanism shown in FIG. 16) so as to be movable between an illustrated retraction position where it is located behind the opening 11 and a projection position where it projects forward through the opening 11.

A barrier 14 is provided in a space between the front wall of the cover 10 and the front surface of the barrel 12. The barrier 14 is movable behind and along the front wall of the cover 10 between a closure position where it closes the opening 11 from behind (i.e., it covers the barrel 12 from front) and an open position where it is retracted sideways from the closure position.

In the cover 10, a chamber 16 for a spool used to wind a film is formed at one side, and a chamber 18 for a cartridge containing the film is formed at the other side. A film driving mechanism 20 and a drive transmission mechanism 22 for drivingly rotating the film are housed at the bottom of the camera. A barrier driving mechanism 24 for opening and closing the barrier 14 is disposed right behind the barrier 14 at a front portion of the camera. A driving force from the drive transmission mechanism 22 is transmittable to the barrier driving mechanism 24. Further, an AF/finder unit 26 is provided at an upper portion of the camera.

It should be appreciated that, although the respective mechanisms 20, 22 and 24 are drawn in blocks to indicate where they are disposed in FIG. 1 for the sake of convenience, they are not actually disposed in blocks.

Figure 2:
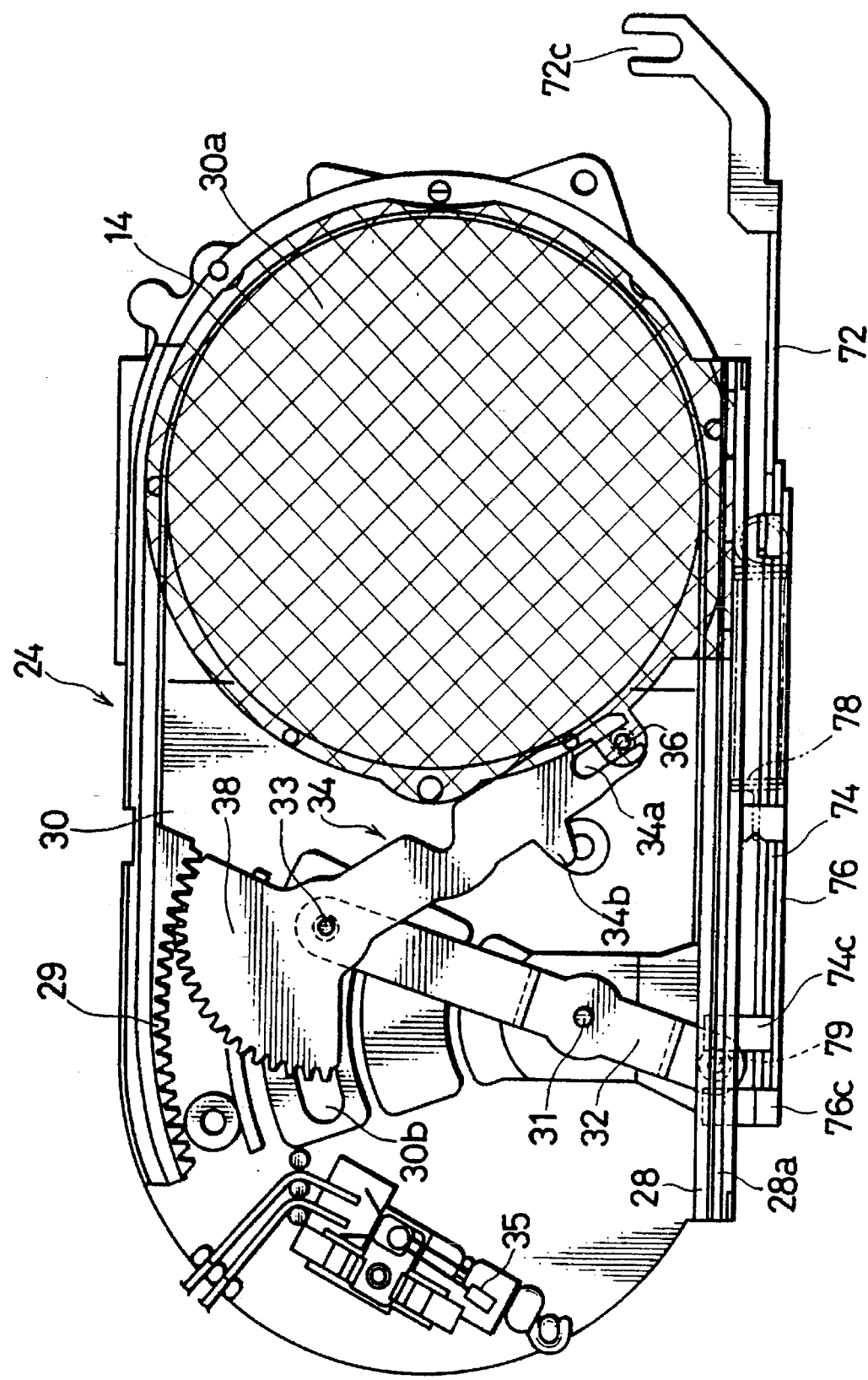
FIG. 2 is a front view of a barrier driving mechanism provided in the camera, a barrier being in its closure position.
Figure 3:
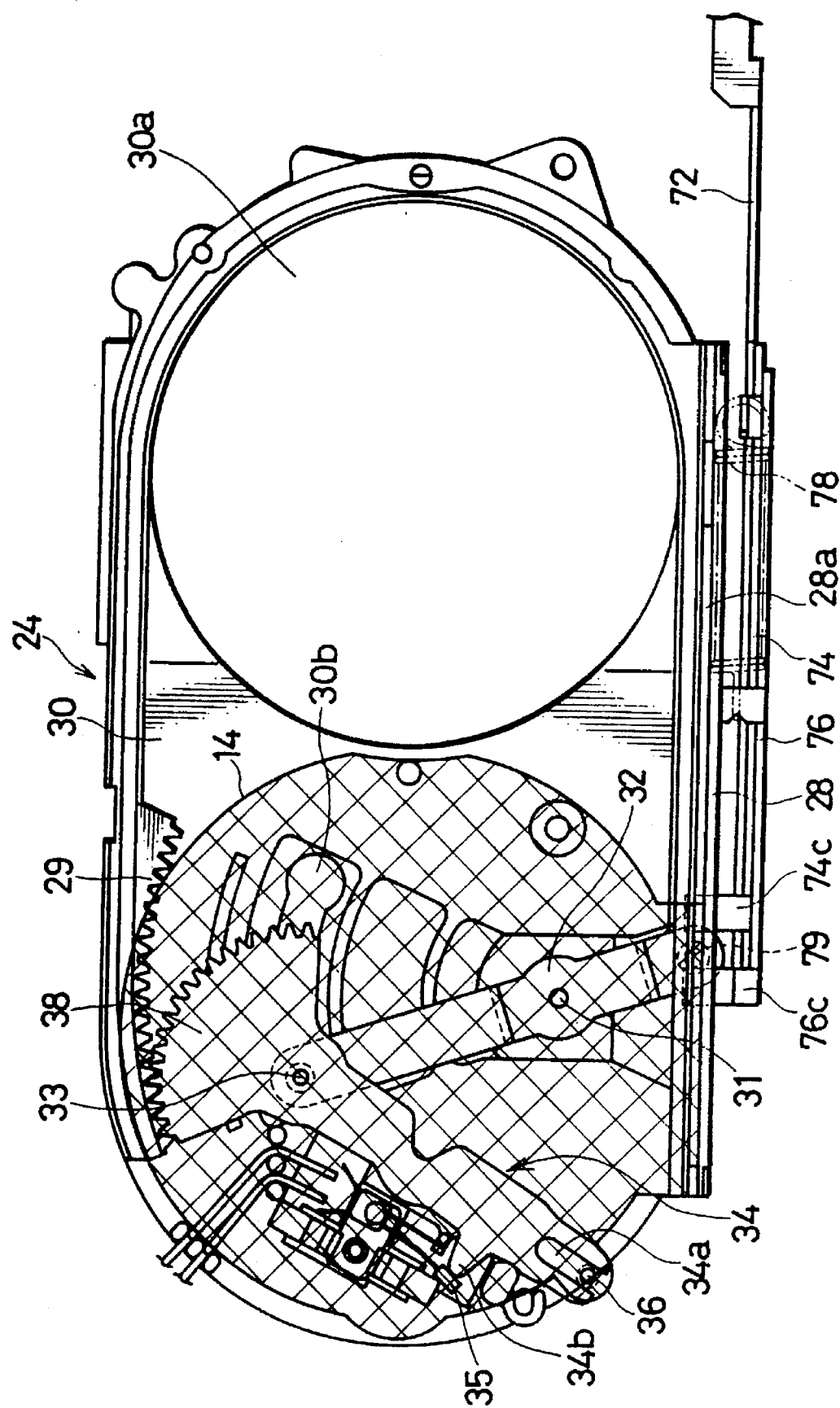
FIG. 3 is a front view of the barrier driving mechanism, the barrier being in its open position.
Figure 4:
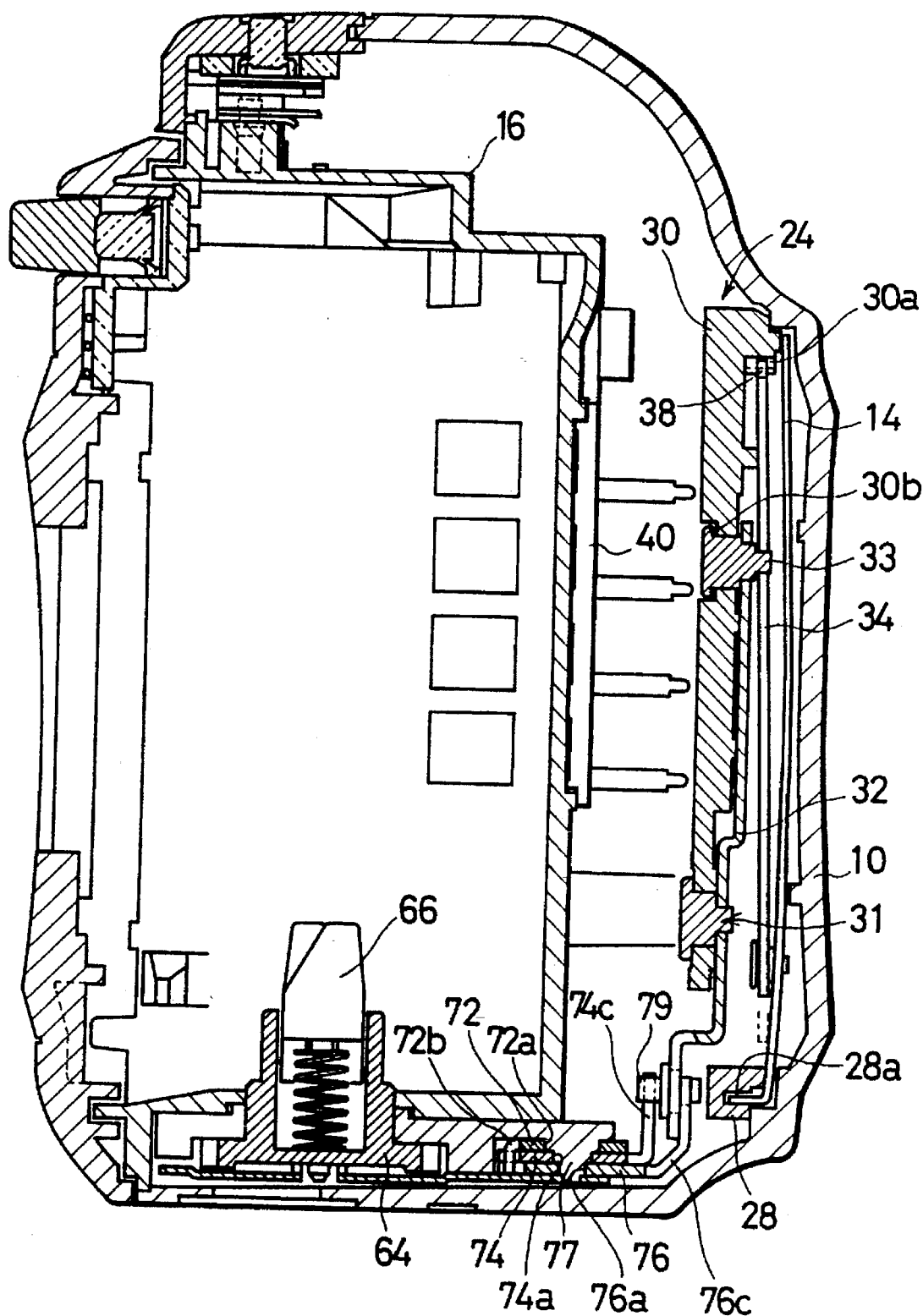
FIG. 4 is a side view in section of the camera.

The barrier driving mechanism 24 is shown in FIGS. 2 to 4. A retaining plate 30 and the barrier 14 are disposed between the cover 10 and a body including the spool chamber 16. A laterally extending guide rail 28 is mounted at the bottom surface of a front portion of the retaining plate 30. The bottom end of the barrier 14 (cross-hatched portion in FIGS. 2 and 3) is fitted into a guide groove 28a formed along the guide rail 28. Accordingly, the barrier 14 is slidably held by the retaining plate 30 in the lateral direction.

On the right side of the retaining plate 30 when viewed from front, there is formed a through hole 30a through which the barrel 12 is insertable and withdrawable. On the left side of the retaining plate 30, a lower portion of a lever 32 is rotatably held about a pin 31. An upper part of a lever 34 is connected with the upper end of the lever 32 via a pin 33 such that the levers 34 and 32 are rotatable with respect to each other. The pin 33 is fitted and held in a retaining slot 30b formed in the retaining plate 30. The retaining slot 30b has an arcuate shape about the pin 31. A lower end 34a of the lever 34 is forked and connected with the periphery of a lower portion of the barrier 14 via a pin 36 such that the lever 34 and the barrier 14 are rotatable with respect to each other. An arcuate gear 38 is formed at the upper end of the lever 34, and is in mesh with an arcuate gear 29 formed at an upper portion of the retaining plate 30.

Accordingly, as the lever 32 rotates about the pin 31, the lever 34 revolves about the pin 31 while rotating about the pin 33. As a result, the barrier 14 connected with the lever 34 slides in the lateral direction between the closure position of FIG. 2 and the open position of FIG. 3.

A projection 34b is formed at the lower end of the lever 34. The retaining plate 30 is provided with an open position confirming switch 35 which comes into contact with the projection 34b only when the barrier 14 is in its open position shown in FIG. 3. When the switch 35 is off, the barrier 14 is confirmed to be in its open position. Further, an electric substrate 40 is provided right behind the retaining plate 30.

Next, the film driving mechanism 20 and the drive transmission mechanism 22 are described with reference to FIGS. 5 to 8. It should be appreciated that FIGS. 5 to 8 are all bottom views.

Figure 5:
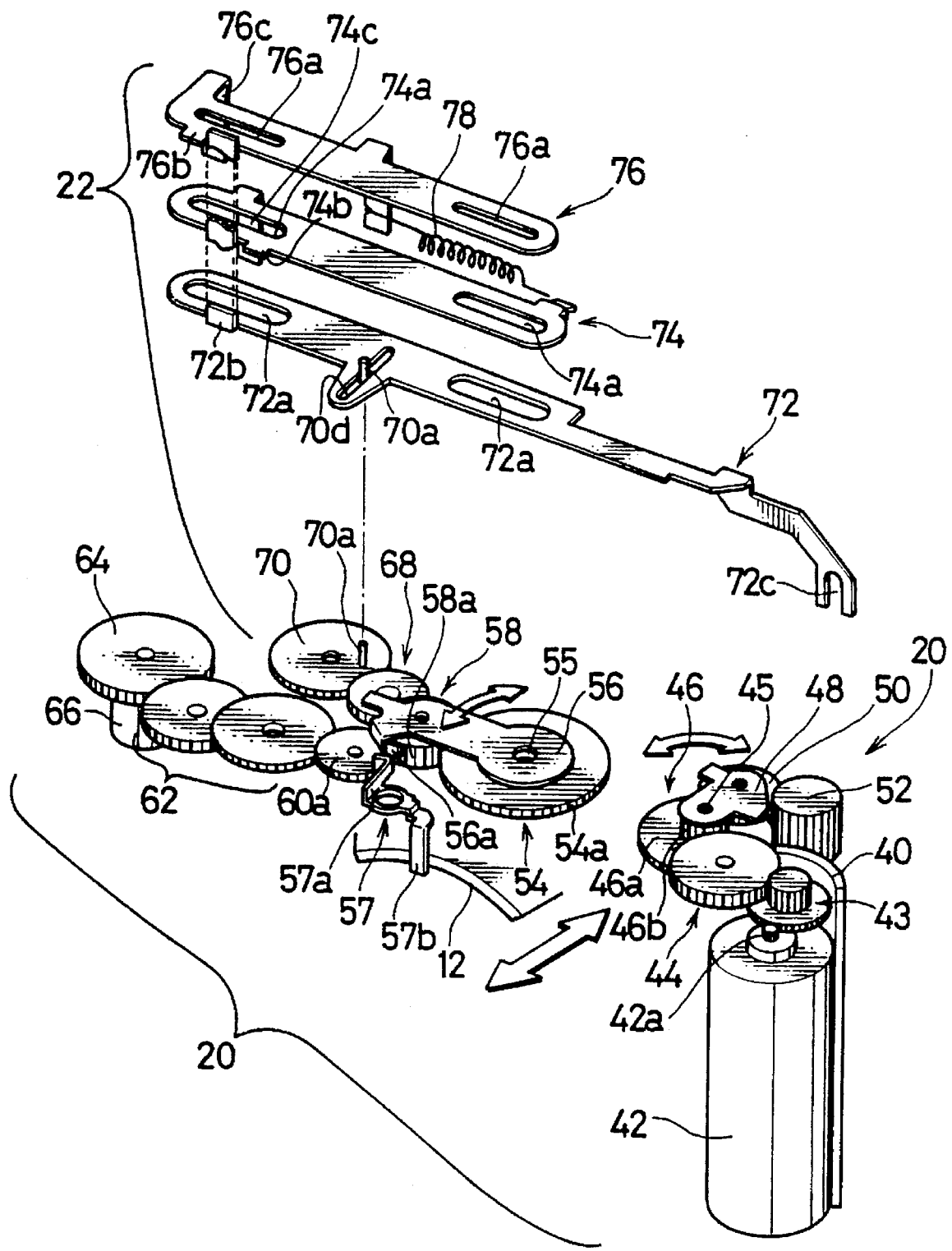
FIG. 5 is an exploded perspective view of a film driving mechanism and a drive transmission mechanism provided in the camera, when viewed from bottom.
Figure 6A:
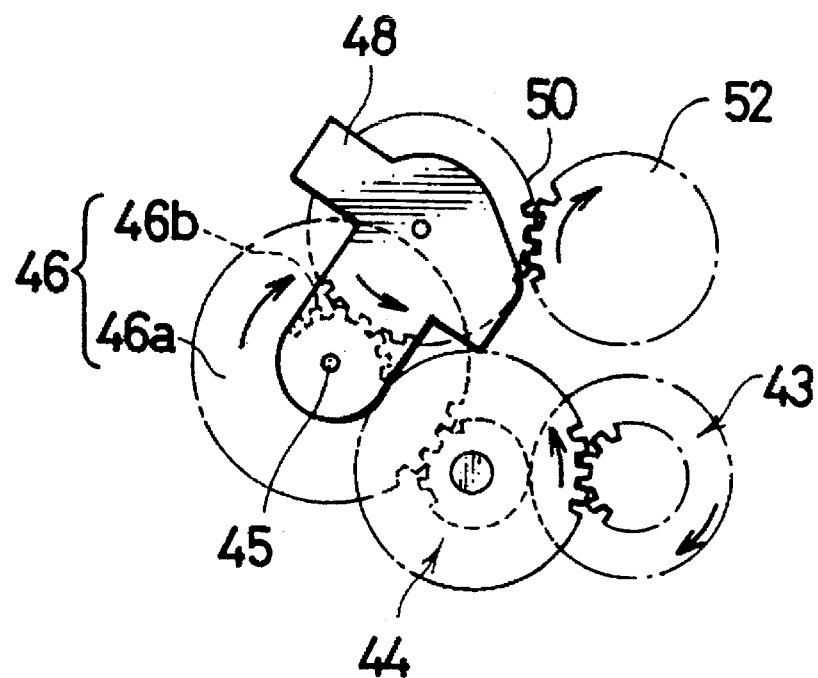
FIGS. 6A and 6B are bottom views of a planetary gear of the film driving mechanism in its winding drive transmission position and its rewinding drive transmission position, respectively.
Figure 6B:
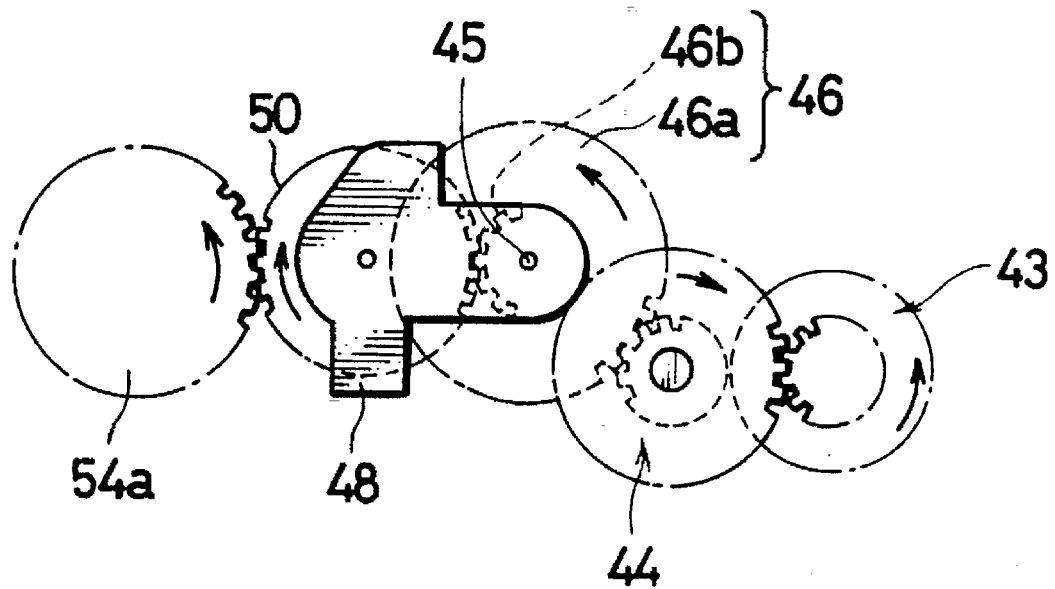

In FIG. 5, a feed motor (film driving source) 42 is disposed and directed downward near a spool 40. A gear 42a is mounted on an output shaft of the feed motor 42, and is coupled with a large diameter gear 46a of a double gear 46 via reduction double gears 43, 44 which are also shown in FIGS. 6A and 6B. An arm 48 is rotatably mounted on a rotational center shaft 45 of the double gear 46. A planetary gear 50 mounted at a rotatable end of the arm 48 is in mesh with a small diameter gear (sun gear) 46b of the double gear 46. As the arm 48 rotates, the planetary gear 50 is changed between a winding drive transmission position where it is in mesh with a gear 52 used to drive the spool 40 as shown in FIG. 6A and a rewinding drive transmission position where it is in mesh with a large diameter gear 54a of a double gear 54 as shown in FIG. 6B.

Figure 7:
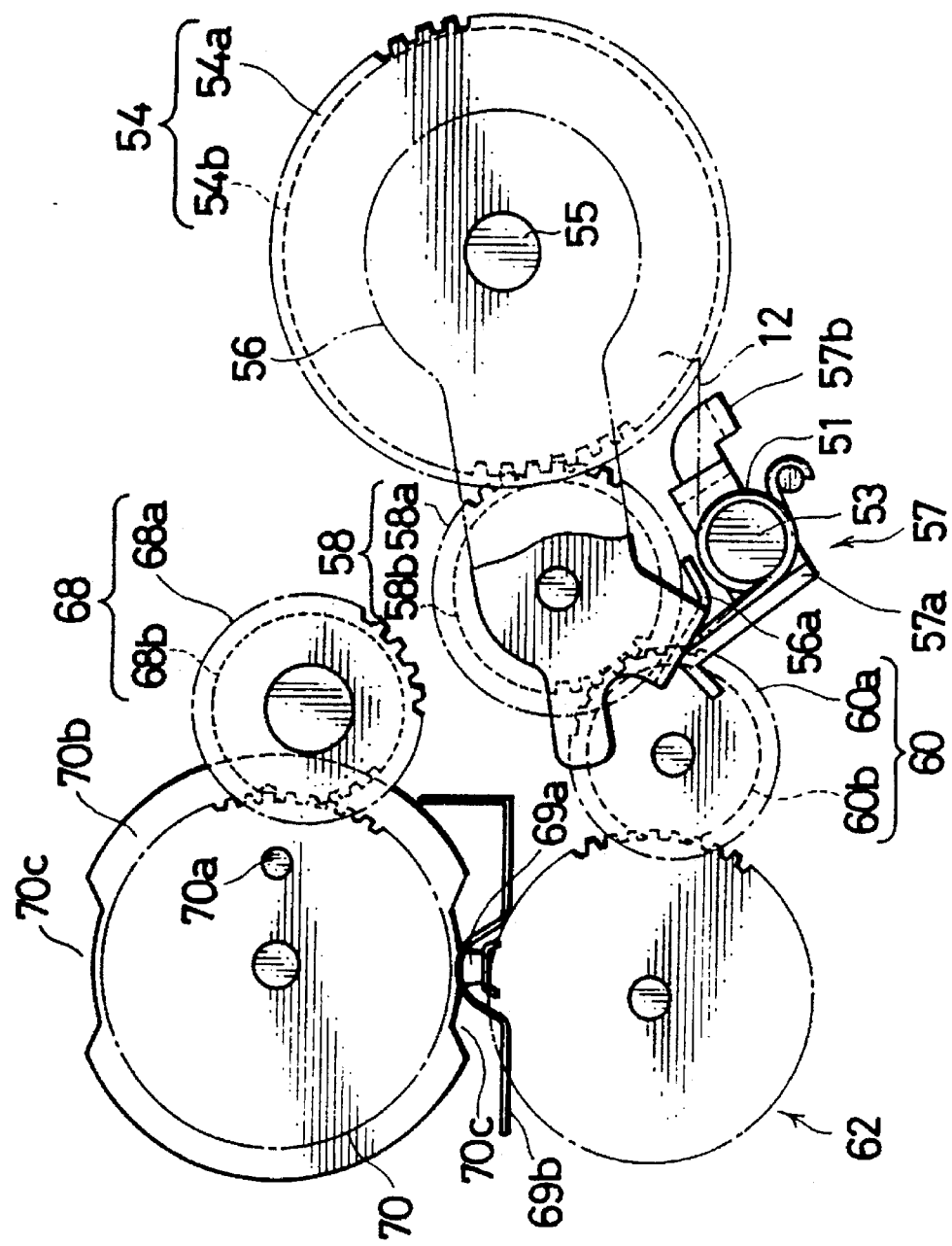
FIG. 7 is a bottom view showing a state where a double gear is in its film rewinding position in the film driving mechanism and the drive transmission mechanism.
Figure 8:
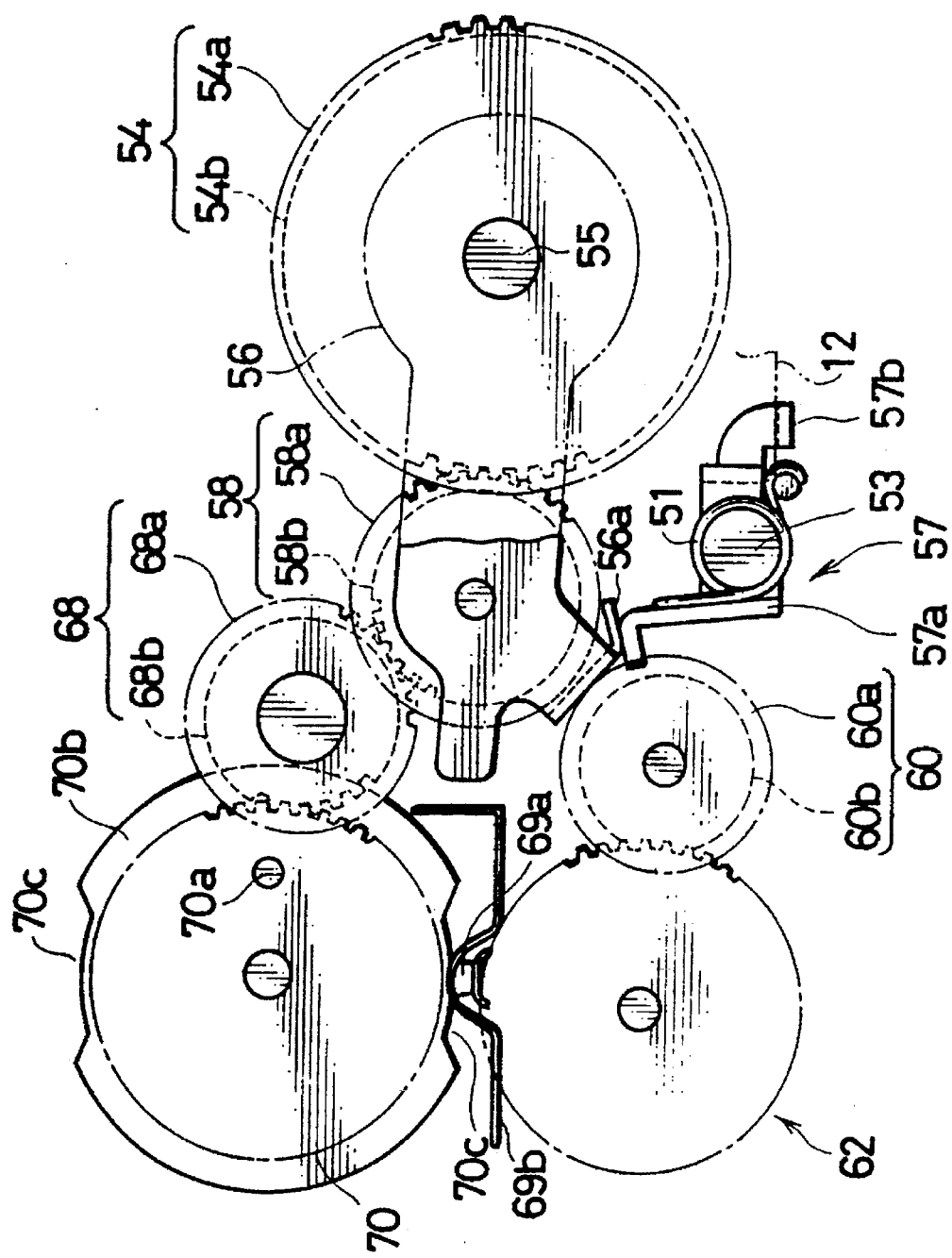
FIG. 8 is a bottom view showing a state where a double gear is in its barrier driving position in the film driving mechanism and the drive transmission mechanism.

As also shown in FIGS. 7 and 8, an arm 56 is mounted on a rotational center shaft 55 of the double gear 54, rotatably about the shaft 55. A frictional force is exerted upon the arm 56 by an unillustrated coil spring or the like, so that the arm 56 rotates as the gear 54 rotates in the counterclockwise direction of FIGS. 7 and 8. A double gear 58 is rotatably mounted at a rotatable end of the arm 56. A large diameter gear (planetary gear) 58a of the double gear 58 is in mesh with the small diameter gear (sun gear) 54b of the double gear 54. According to rotation of the arm 56, the small diameter gear 54b is rotatable between a first position shown in FIG. 7 where it is in mesh with a large diameter gear 60a of a reduction double gear 60 used to rewind the film and a second position shown in FIG. 8 where it is in mesh with a large diameter gear 68a of a double gear 68 used to drive the barrier.

A contact plate 56a is mounted at the rotatable end of the arm 56, and a position changing lever 57 is mounted near the contact portion 56a, rotatably about a center shaft 53 extending in the vertical direction. At one end of the lever 57 is mounted a contact plate 57a which comes into contact with the contact portion 56a. At the other end of the lever 57 is formed a contact portion 57b which comes into contact with the rear end of the barrel 12 in its retraction position. The entire lever 57 is biased in the counterclockwise direction of FIGS. 7 and 8 by a coil spring.

A small diameter gear 60b of the reduction double gear 60 is coupled with a gear 64 used to rewind the film via a reduction gear train 62. As also shown in FIG. 4, a rewinding fork (film driving member) 66 is secured on the gear 64, facing upward (facing downward in FIG. 5). The rewinding fork 66 projects into the bottom of the cartridge chamber 18 to be fittable into a center hole of a film cartridge accommodated in the cartridge chamber 18.

A small diameter gear 68b of the reduction double gear 68 is in mesh with a cam gear 70. A cam pin 70a projects downward (upward in FIG. 5) in a position of the cam gear 70 displaced from its center of rotation. A detection cam 70b formed with two notches 70c spaced apart by 180° is mounted at the outer periphery of one end surface of the cam gear 70. A state detection switch 69 including contact portions 69a, 69b is disposed in a position facing the detection cam 70b. The switch 69 is turned off every time the notch 70c reaches the position of the switch 69.

Below the cam gear 70 and the like, there are arranged three levers 72, 74 and 76 one over another in this order from above (from below in FIG. 5). The levers 72, 74 and 76 are formed with laterally extending oblong holes 72a, 74a and 76a, respectively. As shown in FIG. 4, a pin 77 projects downward from the inner wall of the bottom portion of the camera. By fitting the pin 77 into the oblong holes 72, 74a and 76a, the levers 72, 74 and 76 are supported on the camera main body slidably in the lateral direction.

An oblong hole 72d extending in the forward/backward direction is formed in the lever 72. The cam pin 70a is fitted into the oblong hole 72d. A connection plate 72b extends downward from the lever 72. Projections 74b, 76b project backward from the levers 74, 76 so as to hold the connection plate 72b from opposite sides, respectively. The levers 74, 76 are connected via a tension spring 78 extensible in the lateral direction.

Holding plates 74c, 76c extend upward from positions of the levers 74, 76 which are different with respect to the lateral direction. A pin 79 extending in the forward/backward direction is inserted through the lower end of the lever 32 to fix the lever 32. The pin 79 is held between the holding plates 74c and 76c.

Figure 9:
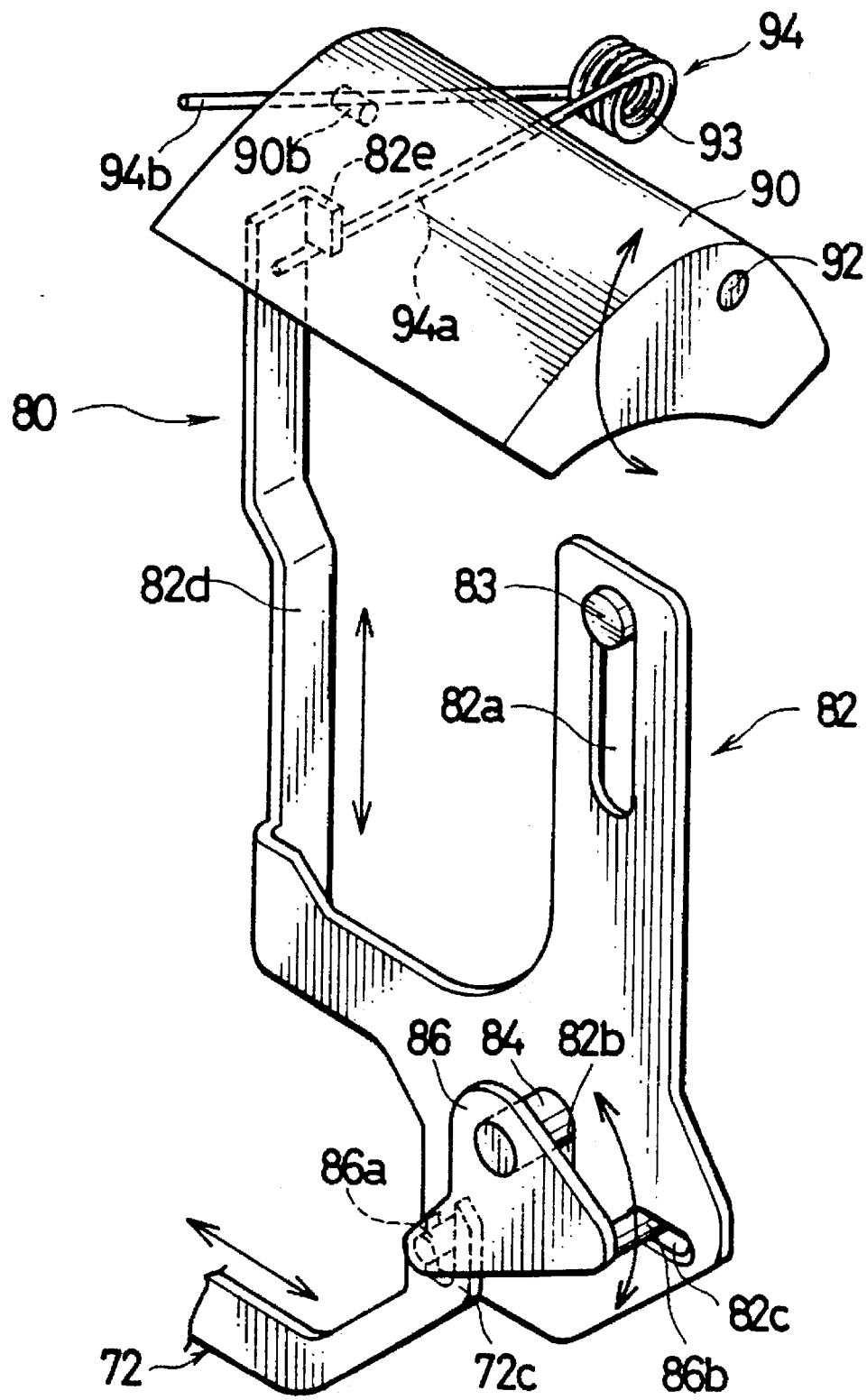
FIG. 9 is a perspective view of a flash elevating mechanism provided in the camera.
Figure 10:
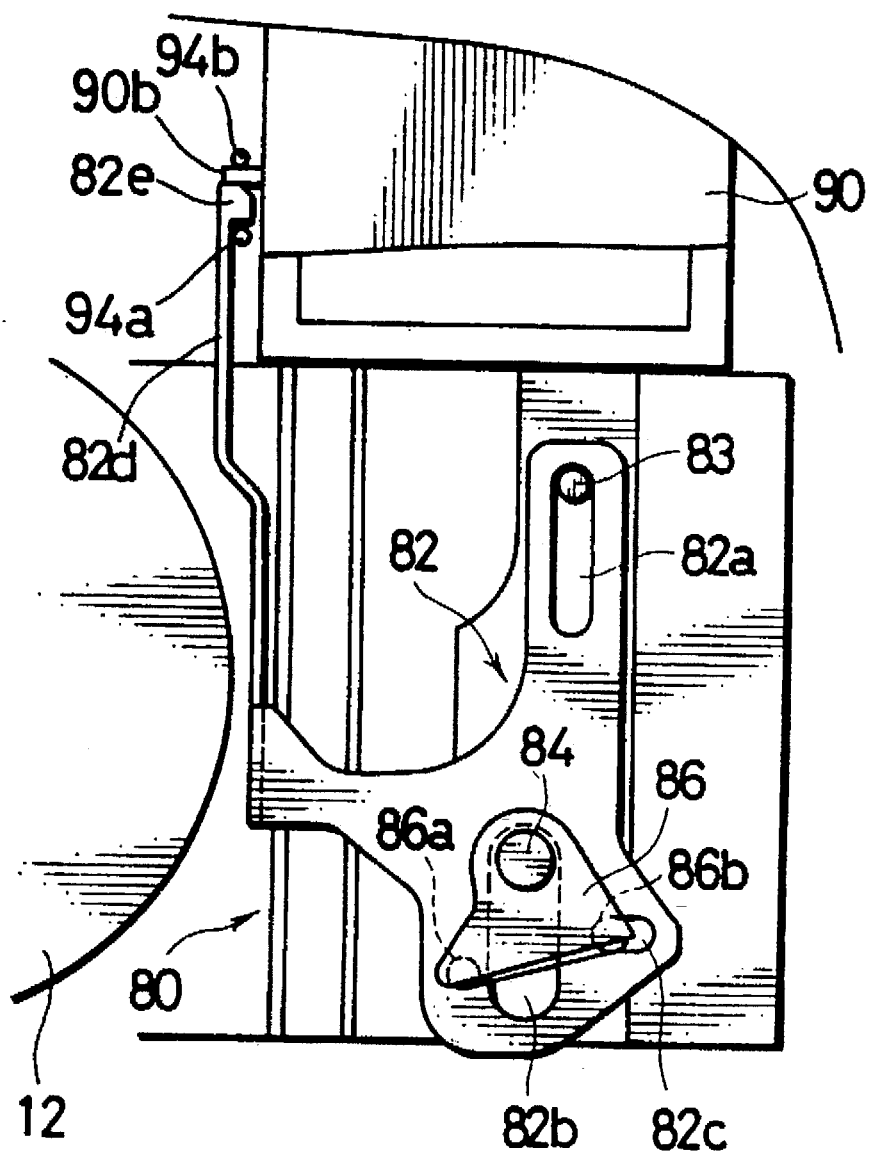
FIG. 10 is a front view of the flash elevating mechanism.

One end 72c (right end when the camera is viewed from front) of the lever 72 is forked. A flash elevating mechanism 80 as shown in FIGS. 9 to 11 is mounted at the end 72c.

The flash elevating mechanism 80 includes an elevating plate 82 which is disposed between the spool chamber 16 and a lens driving unit.

Oblong holes 82a, 82b extending in the vertical direction are formed in the elevating plate 82. By fitting pins 83, 84 formed on the inner wall of the camera into the holes 82a, 82b, the entire elevating plate 82 can be supported on the camera main body, movably upward and downward.

A rotatable member 86 is mounted on the lower pin 84, rotatably about the pin 84. A pin 86a horizontally projects from a position of the rotatable member 86 away from the pin 84. The forked end 72c of the lever 72 is engaged with the pin 86a. Further, a pin 86b projects from a position of the rotatable member 86 away from the pins 84 and 86a. A laterally extending oblong hole 82c is formed in the elevating plate 82, and the pin 86b is fitted into the hole 82c. Accordingly, as the lever 72 moves in the lateral direction, the rotatable member 86 rotates, thereby moving the elevating plate 82 upward and downward.

An arm 82d extending upward from the elevating plate 82 is disposed between the spool chamber 16 and the barrel 12. A hooked engaging portion 82e is formed at the upper end of the arm 82d, and a flash holder 90 is disposed near the engaging portion 82e. The flash holder 90 acts to hold a flash device of the camera and to rotate about a horizontal shaft 90a between an exposing position where the flash device is exposed forward and an accommodating position where the flash device is accommodated. A pin 90b projects from a side wall of the flash holder 90.

A horizontal shaft 93 is disposed behind the flash holder 90, and a torsion spring 94 is mounted around the pin 90b. Opposite ends 94a, 94b of the torsion spring 94 extend forward over a substantial distance while forming a specified angle. One end 94a is located below the other end 94b. The pin 90 and the engaging portion 82e are located between the opposite ends 94a and 94b.

Besides the aforementioned elements, as shown in FIG. 12, the camera is provided with a main switch SW0, a photography preparation switch SW1, a release switch SW2, a controller 96, an alarm device 98, and a barrel motor 99 for driving the barrel 12. The barrel motor 99 is adapted for moving the barrel 12 between the retraction position and the projection position located more forward than the retraction position.

The photography preparation switch SW1 is turned on when an unillustrated release button is pressed halfway, thereby inputting a measurement command signal to the controller 96 to cause the controller 96 to perform a light measurement and a distance measurement. The release switch SW2 is turned on when the release button is completely pressed, thereby inputting an exposure command signal to the controller 96. The controller 96 includes a microcomputer, and controls the driving of the feed motor 42 in accordance with the signals input from the switches SW0, SW1, SW2, the open position confirming switch 35 and the state detection switch 69. If necessary, the controller 96 outputs an alarm command signal to the alarm device 98.

Figure 13:
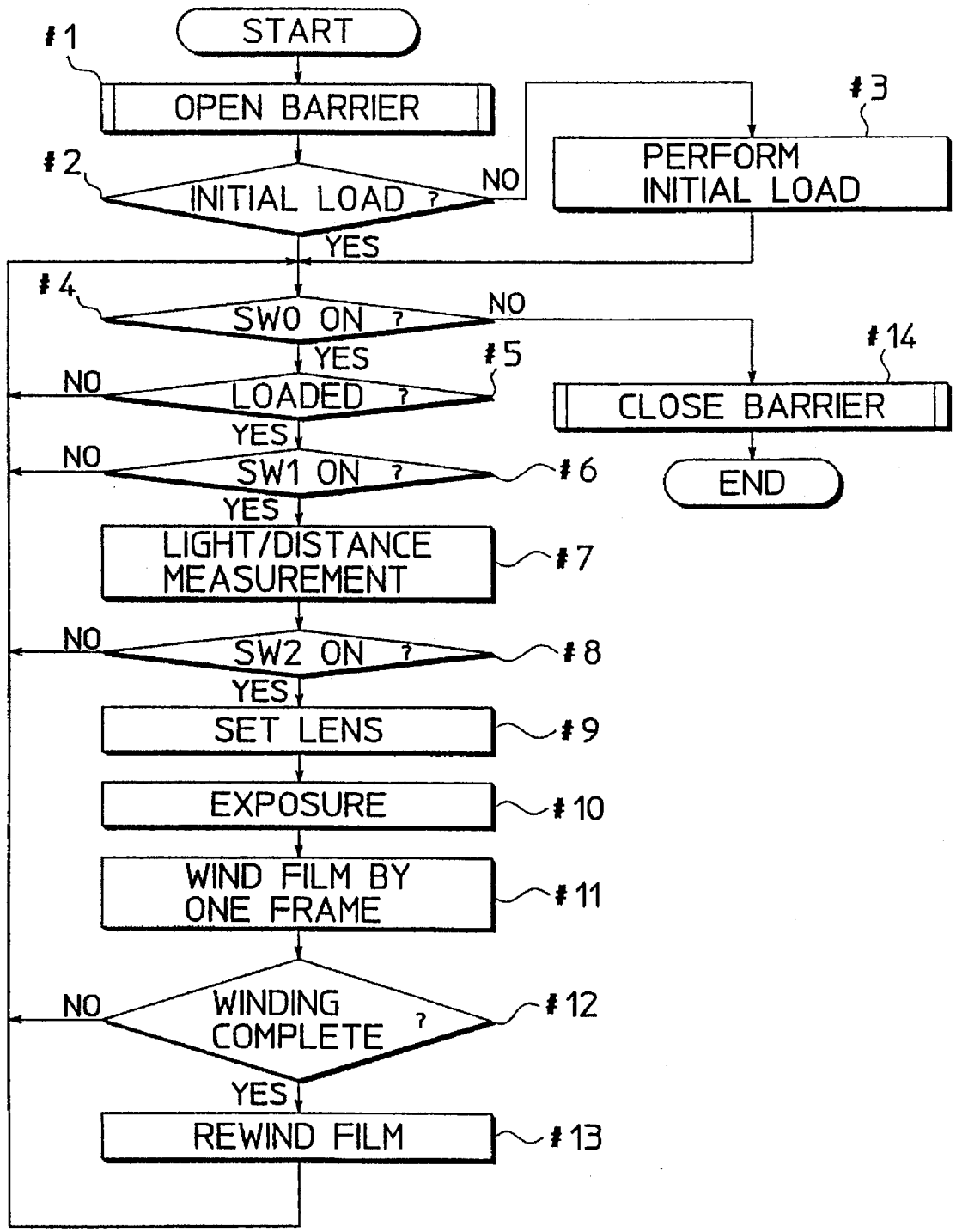
FIG. 13 is a flowchart showing a control operation performed in the camera.
Figure 14:
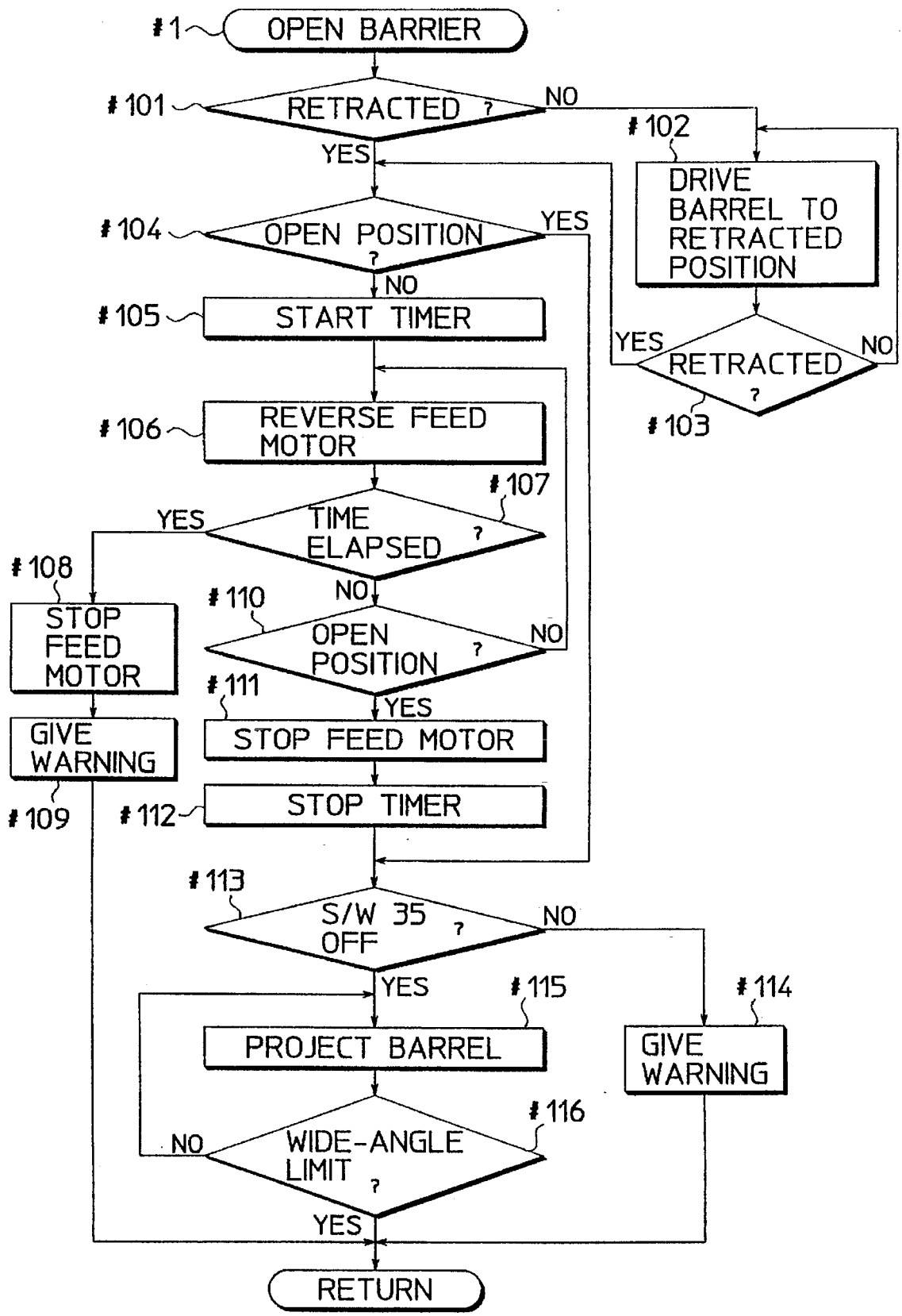
FIG. 14 is a flowchart showing a subroutine "Barrier Open"
Figure 15:
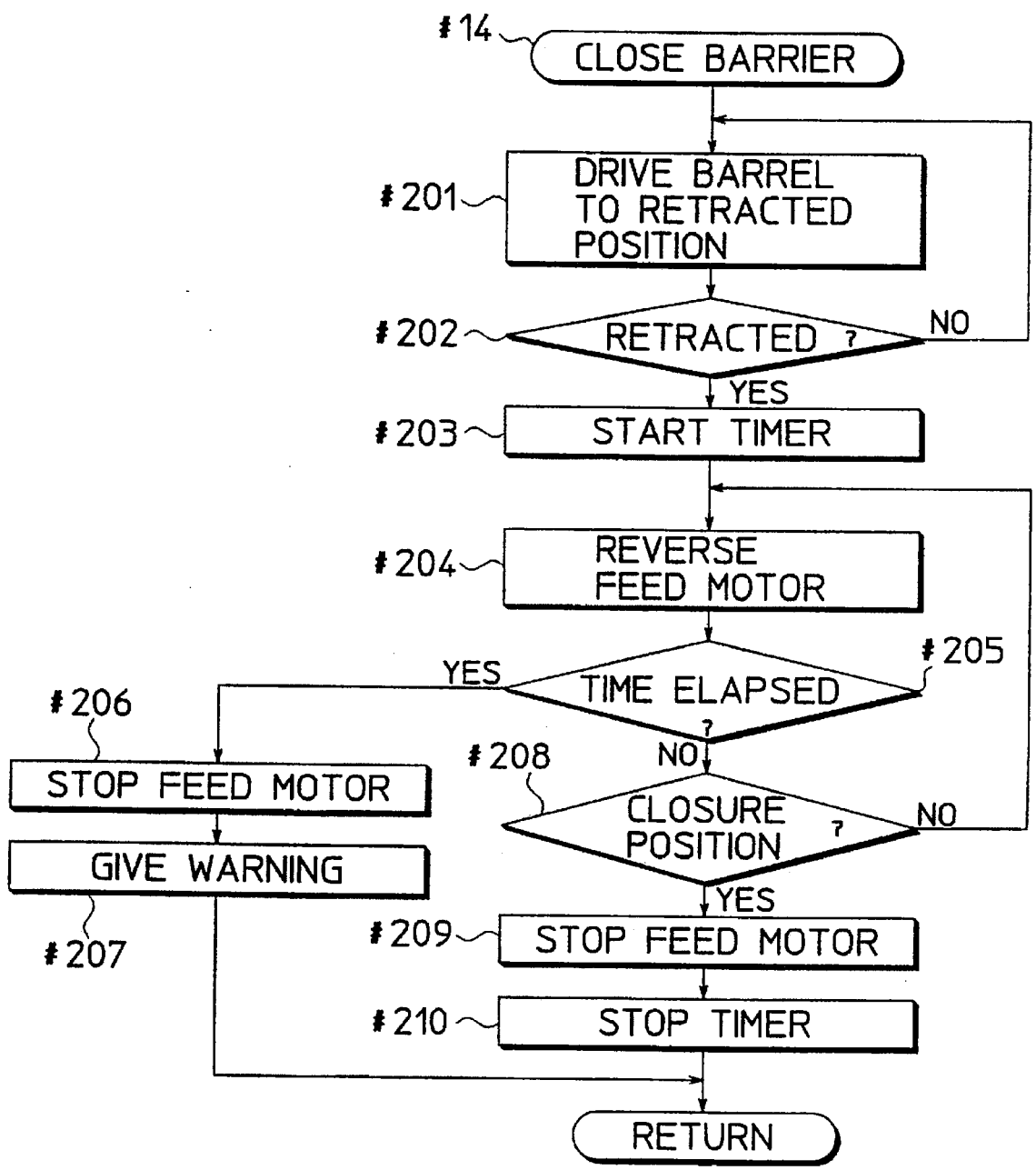
FIG. 15 is a flowchart showing a subroutine "Barrier Close"

The control operation of the controller 96 and the operation of the camera are described with respect to flowcharts shown in FIGS. 13 to 15.

When the main switch SW0 is turned on, the barrier 14 is opened (Step #1 of FIG. 13). The detailed operations performed in Step #1 is shown in the flowchart of FIG. 14.

Before opening the barrier 14, it is discriminated whether the barrel 12 is in its retraction position (Step #101). Unless the barrel 12 is in its retraction position, the barrel 12 is driven to its retraction position (Steps #102 and #103). While the barrel 12 is moved to its retraction position, the rear end thereof comes into contact with the contact portion 57b of the position changing lever 57 as shown in FIG. 8, thereby rotating the lever 57 counterclockwise against the elastic force of the torsion spring 51. Accordingly, the contact plate 57a of the lever 57 presses the contact plate 56a of the arm 56, with the result that the arm 56 and the double gear 58 are rotated to the positions as shown in FIG. 8, i.e. to the positions where the small diameter gear 58b of the double gear 58 is in mesh with the double gear 68a used to drive the barrier 14.

Subsequently, in accordance with a detection signal from the state detection switch 69, it is discriminated whether the cam gear 70 is in such a position as to open the barrier 14 (Step #104). If the cam gear 70 is not in such a position, the feed motor 42 is driven in the reverse direction (in the counterclockwise direction as indicated by the arrow in FIG. 6B) (Step #106) after a timer is started (Step #105).

A driving force of the feed motor 42 is transmitted to the double gear 46 via the gears 43, 44, thereby rotating the double gear 46 in the counterclockwise direction of FIG. 6B. At this time, the arm 48 rotates in the same direction as the double gear 46 due to a frictional force acting between the bottom surface of the double gear 46 and the upper surface of the arm 48, with the result that the planetary gear 50 is brought into engagement with the large diameter gear 54a of the double gear 54. Accordingly, the rotational force of the double gear 46 is transmitted to the cam gear 70 via the planetary gear 50 and the double gears 54, 58, 68, thereby rotating the cam gear 70.

As the cam gear 70 rotates, the lever 72 engaged with the cam pin 70a slides toward the right in FIGS. 2 and 3. Pressed by the connection plate 72b of the lever 72, the lever 74 slides in the same direction as the lever 72. Further, the lever 76 connected with the lever 74 via the torsion spring 78 slides in the same direction. Accordingly, the pin 79 held by the holding plates 74c, 76c of the levers 74, 76 moves in the same direction as the levers 74, 76, thereby rotating the lever 32 secured with the pin 79 in the counterclockwise direction of FIG. 2. As the lever 32 rotates, the lever 34 rotates about the pin 33 and its lower end 34a moves toward the left while the gear 38 at the upper end of the lever 32 is brought into engagement with the gear 29 formed on the retaining plate 30. The barrier 14 connected with the lower end 34a via the pin 36 slides from the closure position shown in FIG. 2 to the open position shown in FIG. 3 along the guide rail 28.

Unless the cam gear 70 reaches the open position (where the notch 70c of the detection cam 70b is detected by the state detection switch 69) within a predetermined time after the start of the timer (YES in Step #107), the feed motor 42 is stopped (Step #108) and the alarm device 98 is caused to give a warning (Step #109) upon determination that an error has occurred in the drive transmission system.

On the other hand, if the cam gear 70 reaches the open position within the predetermined period (NO in Step #110), the feed motor 42 and the timer are stopped (Steps #111 and #112).

At this stage, if the open position confirming switch 35 is not off, i.e. if the projection 34b of the lever 34 is not in contact with the switch 35 (not the state shown in FIG. 3: NO in Step #113), the barrier 14 has not been moved to the open position shown in FIG. 3 despite the fact that the cam gear 70 is normally driven. Accordingly, in this case as well, a warning is given upon determination that an error has occurred (Step #114). On the other hand, if the switch 35 is off, i.e. if the barrier 14 has actually reached the open position (YES in Step #113), the barrel 12 is driven to project through the opening 30a of the retaining plate 30 and the opening 11 of the cover 10 (Step #115) until it reaches a specified wide-angle limit (YES in Step #116). By driving the barrel 12 to project, its rear end comes out of contact with the contact portion 57b of the position changing lever 57. As a result, the lever 57 rotates in the counterclockwise direction of FIG. 7 due to the elastic force of the torsion spring 51.

Figure 11A:
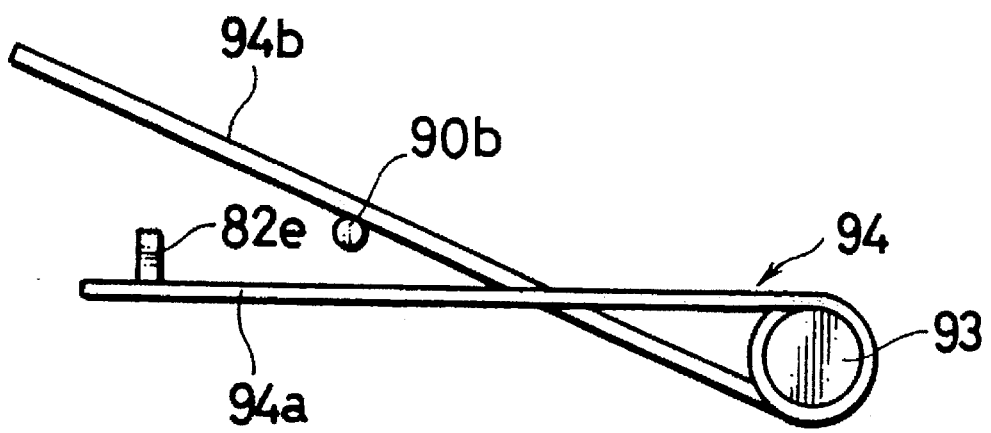
FIGS. 11A and 11B are side views showing states where a pin of a flash holder are pulled down and up in the flash elevating mechanism, respectively.
Figure 11B:
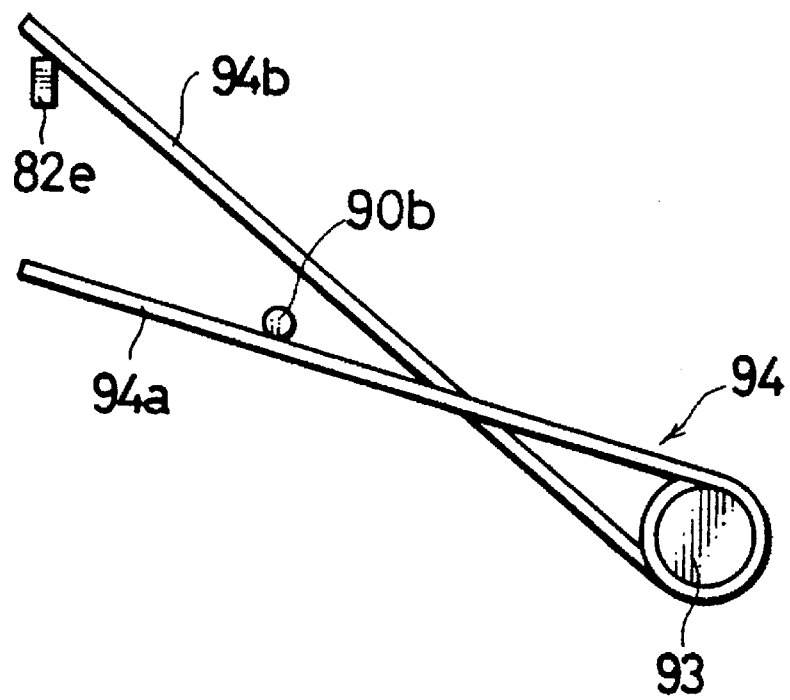

As the lever 72 moves toward the right in FIG. 2 during the opening of the barrier 14, the rotatable member 86 shown in FIGS. 9 and 10 rotates in the counterclockwise direction of FIGS. 9 and 10, thereby moving the elevating plate 82 upward. At this time, since the engaging portion 82e formed at the upper end of the arm 82d lifts one end 94b of the torsion spring 94 as shown in FIG. 11B, the other end 94a of the torsion spring 94 lifts the pin 90b. Thus, the flash holder 90 is automatically opened when the barrier 14 is opened, thereby making the flash device ready to use.

After opening the barrier 14 as described above, an initial load is performed (Step #3) unless it has not yet been completed (NO in Step #2 of FIG. 13). After confirming that the main switch SW0 is on and that the film is loaded (Steps #4 and #5), the light measurement and the distance measurement are performed (Step #7) when the photography preparation switch SW1 is turned on (YES in Step #6). When the release switch SW2 is turned on (YES in Step #8), a lens is set (Step #9) and an exposure is performed (Step #10). Thereafter, the film is wound by one frame (Step #11).

The winding is performed by rotating the gear 42a mounted on the output shaft of the feed 42 such that the double gear 43 in mesh with the gear 42a rotates in the direction indicated by the arrow in FIG. 6A (clockwise direction of FIG. 6A). The driving force is transmitted via the double gear 44 to the double gear 46, which in turn rotates in the clockwise direction of FIG. 6A. At this time, the arm 48 rotates in the same direction as the double gear 46 due to the frictional force between the bottom surface of the double gear 46 and the upper surface of the arm 48, and the planetary gear 50 mounted on the arm 48 is changed to its winding drive transmission position where it is in mesh with the gear 52 used to drive the spool 40. Accordingly, the rotational force of the double gear 46 is transmitted to the gear 52 via the planetary gear 50, with the result that the spool 40 coupled with the gear 52 is rotated by a specified amount to wind the film.

When the film is completely used after repeating the photographing operation and the winding of the film (YES in Step #12), the film is rewound (Step #13). The rewinding is performed by rotating the gear 42a mounted on the output shaft of the feed 42 such that the double gear 43 in mesh with the gear 42a rotates in the direction opposite from the above, i.e. the direction indicated by the arrow in FIG. 6B (counterclockwise direction of FIG. 6B). The driving force is transmitted via the double gear 44 to the double gear 46, which in turn rotates in the counterclockwise direction of FIG. 6B. At this time, the arm 48 rotates in the same direction as the double gear 46 due to the frictional force between the bottom surface of the double gear 46 and the upper surface of the arm 48, and the planetary gear 50 mounted on the arm 48 is changed to its rewinding drive transmission position where it is in mesh with the large diameter gear 54 of the double gear 54. Accordingly, the rotational force of the double gear 46 is transmitted to the double gear 54 via the planetary gear 50. As the double gear 54 rotates, the arm 56 secured with the double gear 58 rotates to a position where the double gear 58 is in mesh with the double gear 60. Thereafter, the rotational force of the double gear 54 is transmitted to the gear 64 used to rewind the film via the double gears 58, 60 and the reduction gear train 64. The film is rewound by rotating the rewinding fork 66 secured on the gear 64.

If the main switch SW0 is turned off after the rewinding, or while the film is being used (NO in Step #4), the barrier 14 is closed (Step #14). The detailed barrier closing operation is shown in FIG. 15.

Before closing the barrier 14, the barrel 12 is driven to its retraction position (Step #201). As the barrel 12 is moved to its retraction position, its rear end comes into contact with the contact portion 57b of the position changing lever 57, thereby rotating the lever 57 in the clockwise direction of FIG. 8 against the elastic force of the torsion spring 57. Accordingly, the contact plate 57a of the lever 57 presses the contact plate 56a of the arm 56, with the result that the arm 56 and the double gear 58 are positioned as shown in FIG. 8, i.e. are positioned such that the small diameter gear 58b of the double gear 58 is in mesh with the double gear 68a used to drive the barrier 14.

The timer is started (Step #203) when the barrel 12 reaches its retraction position (YES in Step #202), and the feed motor 42 is driven in the reverse direction (in the counterclockwise direction indicated by the arrow in FIG. 6B) (Step #204).

The driving force is transmitted to the cam gear 70 in a manner similar to the one described in association with the opening operation of the barrier and with respect to FIG. 14. The lever 72 engaged with the cam pin 70a slides toward the left in FIGS. 2 and 3 opposite from the case where the barrier 14 is closed. Thereby, the connection plate 72b of the lever 72 presses the projection 76b of the lever 76, which in turn slides in the same direction as the lever 72. Further, the lever 74 connected with the lever 76 via the torsion spring 78 slides in the same direction. Accordingly, the pin 79 held between the holding plates 74c and 76c of the levers 74 and 76 moves in the same direction as the levers 74, 76, and the lever 32 secured with the pin 79 rotates in the clockwise direction of FIG. 3. As the lever 32 rotates, the lever 34 rotates about the pin 33, and the lower end 34a of the lever 34 moves toward the right while the gear 38 formed at the upper end of the lever 34 is brought into engagement with the gear 29 formed in the retaining plate 30. The barrier 14 connected with the lower end 34a via the pin 36 slides from the open position shown in FIG. 3 to the closure position shown in FIG. 2 along the guide rail 28.

Unless the cam gear 70 reaches the closure position (where the notch 70c of the detection cam 70b is detected by the state detection switch 69) within a predetermined time after the start of the timer (YES in Step #205), the feed motor 42 is stopped (Step #206) and the alarm device 98 is caused to give a warning (Step #207) upon determination that an error has occurred in the drive transmission system.

On the other hand, if the cam gear 70 reaches the closure position within the predetermined period (YES in Step #208), the feed motor 42 and the timer are stopped (Step #209 and #210). Consequently, the movement of the barrier 14 to its closure position is completed.

As the lever 72 moves toward the left in FIG. 3 during the closing of the barrier 14, the rotatable member 86 shown in FIGS. 9 and 10 rotates in the clockwise direction of FIGS. 9 and 10, thereby moving the elevating plate 82 downward. At this time, since the engaging portion 82e formed at the upper end of the arm 82d lowers one end 94a of the torsion spring 94 as shown in FIG. 11A, the other end 94b of the torsion spring 94 lowers the pin 90b. Thus, the flash holder 90 is automatically closed when the barrier 14 is closed, thereby covering the flash device.

As described above, the above camera is provided with a path changeable transmission device (arm 56, double gear 58, etc.) for changeably transmitting the driving force of the feed motor 42 to drive the film and to drive barrier 14. The feed motor 42 is used as a driving source of the barrier 14. Accordingly, the size of the entire camera can be considerably made smaller, compared to a case where a motor for driving the barrier is separately provided. Even compared with the prior art device shown in FIG. 16 in which the motor 202 for driving the barrel is used also as a driving source of the barrier 205, the camera according to the foregoing embodiment can be fabricated in a smaller size and more inexpensively for the following reason. Since the projection of the barrel 200 and the opening of the barrier 205 need to be simultaneously performed in the prior art device, a driving load is large. Accordingly, the motor 202 for driving the barrel 200 needs to have a large capacity. As opposed to this, a motor having a far smaller capacity can be used to drive the barrel in the camera according to the foregoing embodiment because the driving of the barrier 14 and the driving of the film need not be simultaneously performed.

According to the foregoing embodiment, the following advantageous effects can be obtained.

(a) Since the position changing lever 57 whose position is changed as the barrel 12 is moved to its retraction position forms the path changeable transmission device for transmitting the driving force of the feed motor 42 to drive the barrier 14 when the barrel 12 is in its retraction position while transmitting it to drive the film when the barrel 12 is in its projection position, the drive transmission path can be automatically changed at suitable timings even without causing the controller 96 to perform a special control to change the transmission path of the driving force. There is also an advantage that the driving of the barrier 14 is securely prevented when the barrel 12 is in its projection position.

(b) Since the barrier 14 is disposed behind the front wall of the cover 10 to close and open the opening 11 formed in the cover 10, a space for allowing a lateral movement of the barrier 14 can be securely ensured in a compact construction. Further by disposing the retaining plate 30 upright right behind the barrier 14 to hold the barrier driving mechanism 24 and by disposing the film driving mechanism 20 at the bottom of the camera, the mechanisms 20 and 24 can be suitably and separately accommodated in the camera. Accordingly, the driving of the film and the driving of the barrier 14 can be both performed in the compact construction which effectively utilizes a small space.

(c) Since the levers 74 and 76 are connected via the torsion spring 78 or like spring means to permit them to move with respect to each other in the lateral direction within a specified range, even if the movement of the barrier 14 is deterred by a finger or the like, e.g. when the barrier 14 is opened, the levers 72, 74 can move toward the right in FIG. 2, leaving the lever 76 engaged with the barrier 14 via the pin 79. This prevents the driving mechanisms from being damaged due to an excessive load. Further, since the lever 76 is pulled toward the right in FIG. 2 by the elastic force of the torsion spring 78 if an obstacle such as a finger is removed after only the levers 72, 74 were moved, the barrier 14 can be automatically slid to its open position. On the other hand, even if the movement of the barrier 14 is deterred while it is closed, the levers 72, 76 can be moved toward the left in FIG. 3, leaving the lever 74 engaged with the barrier 14 via the pin 79. Accordingly, in this case as well, the damage of the driving mechanism due to an excessive load can be prevented. Further, since the lever 74 is pulled toward the left in FIG. 3 by the elastic force of the torsion spring 78 if the obstacle is removed after only the levers 72, 76 were moved, the barrier 14 can be automatically slid to its open position.

(d) The lever 72 movable as the barrier 14 moves is connected with the flash elevating mechanism 80 such that the flash holder 90 is opened when the barrier 14 is opened and is closed when the barrier 14 is closed. Accordingly, without providing a special control, the flash device is made ready to use by opening the flash holder 90 during the photographing operation.

Although the driving force of the feed motor 42 in the film rewinding direction is transmitted to the barrier driving mechanism 24 in the foregoing embodiment, the driving force in the film winding direction may be transmitted to the barrier driving mechanism 24. However, in the case that the driving force in the film winding direction is used to drive the barrier 14, an accurate positioning control is necessary since the film is in principle wound frame by frame. If the driving state is changed from the driving of the film to the driving of the barrier 14 during the use of the film, a positioning control for the next film winding is considerably complicated. Contrary to this, since the film is in principle rewound once, no special positioning control is necessary if the driving force in the film winding direction is used to drive the barrier 14.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A camera comprising:
    a driving source which generates a driving force;
    a film driving mechanism which uses the driving force to drive a loaded film;
    a barrier which is movable between a closed position for covering a lens and an open position for exposing the lens;
    a barrier driving mechanism which uses the driving force to move the barrier between the closed position and the open position;
    a lens barrel which is movable between a projection position in which it projects from a main body of the camera and a retraction position in which it is retracted in the camera main body; and
    a path changeable transmission device which changeably transmits the driving force from the driving source to the film driving mechanism and to the barrier driving mechanism, said path changeable transmission device including a changing member operatively connected with the barrel, the changing member being moved to a first position when the barrel is moved to the projection position of the barrel and to a second position when the barrel is moved to the retraction position of the barrel, the path changeable transmission device having a first state when the changing member is in the first position for transmitting the driving force to the film driving mechanism and a second state when the changing member is in the second position for transmitting the driving force to the barrier driving mechanism.

2. A camera as defined in claim 1, wherein the barrier driving mechanism is placed in operation when the lens barrel is in the retraction position.

3. A camera as defined in claim 1, wherein the barrier driving mechanism is transmitted with the driving force that is usable for the film driving mechanism to rewind the film.

4. A camera as defined in claim 1, further comprising:

a flash which generates flash light and is movable between two specified positions; and a mechanism which operatively connects the movement of the barrier with the movement of the flash.

5. A camera comprising:

a lens barrel which is movable between a projection position in which it projects from a main body of the camera and a retraction position in which it is retracted in the camera main body;

a film driving mechanism which drives a loaded film;

a barrier which is movable between a closed position for covering the lens barrel in the retraction position and an open position for allowing the lens barrel to project from the main body;

a barrier driving mechanism which moves the barrier between the closed position and the open position;

a first driving source which is adapted for driving the lens barrel;

a second driving source which is adapted for driving the film driving mechanism and the barrier driving mechanism; and a path changeable transmission device which is operatively connected with the movement of the barrel and which changeably transmits a driving force of the second driving source to the film driving mechanism and the barrier driving mechanism, said path changeable transmission device transmitting the driving force of the second driving source to the barrier driving mechanism when the lens barrel is in the retraction position and transmitting the driving force of the second driving source to the film driving mechanism when the lens barrel is in the projection position.

6. A camera as defined in claim 5, wherein the barrier driving mechanism is transmitted with the driving force of the second driving source that is usable for the film driving mechanism to rewind the film.

7. A camera as defined in claim 5, further comprising:

a flash which generates flash light and is movable between two specified positions; and a mechanism which operatively connects the movement of the barrier with the movement of the flash.

8. A camera comprising:

a lens barrel which is movable between a projection position in which it projects from a main body of the camera and a retraction position in which it is retracted in the camera main body;

a first driving motor which generates a driving force for the movement of the lens barrel;

a film driving mechanism which drives winding and rewinding of a loaded film;

a barrier which is movable between a closed position of covering the lens barrel in the retraction position and an open position of allowing the lens barrel to project from the main body;

a second driving motor which generates a driving force for the film driving mechanism and the barrier driving mechanism; and a path changeable transmission device which is operatively connected with the movement of the lens barrel, and which changeably transmits the driving force of the second driving motor to the film driving mechanism and the barrier driving mechanism in such a manner as to transmit the driving force of the second driving motor to the barrier driving mechanism when the lens barrel is in the retraction position and transmit the driving force of the second driving motor to the film driving mechanism when the lens barrel is in the projection position.

9. A camera as defined in claim 8, wherein the path changeable transmission device changes the transmission path in operative connection with the movement of the barrel.

10. A camera as defined in claim 8, further comprising:

a flash which generates flash light and is movable between two specified positions; and a mechanism which operatively connects the movement of the barrier with the movement of the flash.

* * * * *